United States Patent [19]

Kettinger

[11] Patent Number: 4,486,299
[45] Date of Patent: Dec. 4, 1984

[54] REMOVING NH₃ AND H₂S FROM AQUEOUS STREAMS

[75] Inventor: James G. Kettinger, Borger, Tex.

[73] Assignee: Phillips Petroleum Company, Bartlesville, Okla.

[21] Appl. No.: 416,775

[22] Filed: Sep. 10, 1982

[51] Int. Cl.³ .............................................. B01D 3/34
[52] U.S. Cl. ..................................... 208/356; 208/47; 208/347
[58] Field of Search .......................... 208/47, 347, 356; 203/7, 10

[56] References Cited

U.S. PATENT DOCUMENTS

| | | | |
|---|---|---|---|
| 2,162,933 | 6/1939 | Bolinger et al. | 208/47 |
| 2,310,837 | 2/1943 | Carpenter et al. | 208/47 |
| 2,908,640 | 10/1959 | Dougherty | 208/47 |
| 2,920,030 | 1/1960 | Thompson | 208/47 |
| 2,964,383 | 12/1960 | Cobb, Jr. | 208/47 X |
| 3,024,171 | 3/1962 | Bone, Jr. | 208/47 |
| 3,078,223 | 2/1963 | Thompson | 208/47 |
| 3,189,537 | 6/1965 | Carlton | 208/47 |
| 3,272,736 | 9/1966 | Petro et al. | 208/47 |
| 3,384,577 | 5/1968 | Shaffer et al. | 208/356 |
| 3,547,806 | 12/1970 | Matyear | 208/47 X |
| 3,923,606 | 12/1975 | Hausler | 203/7 |
| 3,989,459 | 11/1976 | Nose et al. | 208/47 X |

Primary Examiner—Patrick Garvin
Assistant Examiner—Glenn A. Caldarola

[57] ABSTRACT

Nitrogen and sulfur contaminants are removed from an aqueous stream containing the same by steam stripping the aqueous stream to produce a first vapor stream, containing water and a major portion of NH₃ and H₂S, reducing the temperature of the first vapor stream to a temperature at which a substantial portion of H₂S is insoluble in water to produce a second vapor stream, containing a major portion of the H₂S, and a second liquid stream, containing a major portion of the NH₃, and separating the second vapor and liquid streams. The second liquid stream is added to a fluid containing acidic materials to reduce corrosion and the formation of solid deposits. Preferably, the aqueous stream is obtained from refinery operations and the fluid containing acidic materials is the overhead of a crude oil fractional distillation step.

10 Claims, 1 Drawing Figure

REMOVING NH₃ AND H₂S FROM AQUEOUS STREAMS

The present invention relates to a method for removing $NH_3$ and $H_2S$ from an aqueous stream. In another aspect, the present invention relates to a method for removing $NH_3$ and $H_2S$ from an aqueous stream and utilizing at least a portion of the separated $NH_3$ to reduce corrosion and deposition of solids from fluids containing acidic materials.

BACKGROUND OF THE INVENTION

Numerous industrial processes produce aqueous streams containing significant amounts of various forms of nitrogen and sulfur contaminants. Such aqueous streams pose serious problems, to the extent that the water cannot be directly disposed of in streams, ponds or the like without the pollution of streams, ponds, groundwaters, etc. Accordingly, in order to prevent such pollution, it is necessary to purify such waters prior to disposal. Numerous methods of treating such waters includes steam stripping, flue gas stripping, air oxidation, biological treatment, chemical oxidation, solvent extraction, settling and various combinations of such techniques. However, such treatments add significantly to the cost of industrial operations and the pollutants removed create disposal problems. In addition, unless the volume of the removed pollutants is sufficiently high, it is either uneconomic or impractical to convert the same to useful products and thus reduce the cost of the operation.

There are also numerous industrial operations in which fluids containing insignificant amounts of acidic materials are processed, such as in the distillation of such fluids. As a result, these acidic materials cause corrosion, plugging and fouling of processing equipment, flow lines, etc. Accordingly, in such cases, it is often desirable to treat such fluids to neutralize the acidic materials and thus reduce corrosion and the deposition of solids. However, in such cases, the materials utilized to neutralize the acid materials add significantly to the cost of the operation.

While the present invention is applicable to the solution of the above-mentioned problems in all industrial operations, all of these problems exist and are particularly serious in petroleum refining operation. Accordingly, the following description will be confined to such petroleum refining operations for clarity of description.

Crude oils which are processed in petroleum refineries generally contain a wide variety of contaminants which, if not removed, cause serious pollution problems and unacceptable finished products. For example, most crudes contain varying amounts of nitrogen, sulfur, chlorine, metals and other contaminants in elemental, ionic or compound form, as well as various amounts of water, and the subsequent treatment of crude oil to produce useful products results in the presence of contaminates materials, such as water, or form contaminate materials from materials present in the crude oil. The above-mentioned problems have recently been further exaggerated by the necessity of refining less desirable crudes which contain substantially larger amounts of contaminants and alternate sources of oil, such as shale oils, oils derived from coal, oils derived from tar sands, etc. Obviously, also, these problems will increase still further in the future as a result of the necessity of using alternate sources of oil. By way of specific example, the catalytic hydrodesulfurization and/or hydrodenitrogenization of oils containing nitrogen and sulfur contaminants, such as crude oils, residium (top crude), gas oils, heating distillates, kerosene, napthas and the like result in the production of vapor streams containing nitrogen and sulfur contaminants. There are also numerous other refining processes which utilize hydrogen as a treating agent which result in the same type of vapor streams. Catalytic cracking or catalytic hydrocracking of residums (top crude, virgin gas oils, and the like) also produce vapor streams containing sulfur and nitrogen contaminants, to the extent that the feed material treated contains these contaminants. Such vapor streams also contain varying amounts of water, to the extent that the feed stream being treated contains water. In addition, water or steam is often utilized to scrub these contaminants from such vapors, thereby producing aqueous streams containing the contaminants. There are also various refining operations which utilize steam as a source of heat or as a diluent thus producing an aqueous stream often containing the above-mentioned contaminants.

Numerous refining operations also involve the treatment of fluids containing acidic materials, such fluids containing sulfur and chlorine. For example, in the fractional distillation of crude oils to recover gasoline, various distillates, etc., vapors are produced which contain these acidic materials. As a result, the distillation equipment, as well as flow lines through which the vapor passes and subsequent equipment for treating the vapor stream are corroded seriously, the contaminants also react with various anions present in the crude and the resultant salts tend to deposit on the trays, bubble caps, packing flowlines, etc., requiring cleaning at frequent intervals.

SUMMARY OF THE INVENTION

It is, therefore, an object of the present invention to provide an improved method for overcoming the above-mentioned and other problems of the prior art. Another object of the present invention is to provide an improved process for removing $NH_3$ and $H_2S$ from aqueous streams containing significant amounts of nitrogen and sulfur contaminants. Another and further object of the present invention is to provide an improved method for removing $NH_3$ and $H_2S$ from aqueous streams containing significant amounts of nitrogen and sulfur contaminants produced in the treatment of crude oil. Another and further object of the present invention is to provide an improved method for removing $NH_3$ and $H_2S$ from an aqueous stream containing significant amounts of nitrogen and sulfur contaminants to produce an aqueous stream which can be readily disposed of without pollution problems. A further object of the present invention is to provide an improved process for removing $NH_3$ and $H_2S$ from an aqueous stream containing significant amounts of nitrogen and sulfur contaminants to produce an aqueous stream which can be readily disposed of without pollution problems and simultaneously utilizing the thus removed $NH_3$ to prevent corrosion and solids deposition by fluids containing acidic materials. Yet another object of the present invention is to provide an improved method for removing $NH_3$ and $H_2S$ from an aqueous stream containing significant amounts of nitrogen and sulfur contaminants, separating the $NH_3$ and $H_2S$ and utilizing the $NH_3$ to reduce corrosion and solids deposition from fluids containing acidic materials. A still further object of the present invention is to provide an improved method for removing NH$_3$ and H$_2$S from an aqueous stream containing significant amounts of nitrogen and sulfur contaminants which has been utilized in the processing of crude oil. Another object of the present invention is to provide an improved method for removing NH$_3$ and H$_2$S from an aqueous stream containing significant amounts of nitrogen and sulfur contaminants which has been utilized in the treatment of crude oils and utilizing the thus removed NH$_3$ to reduce corrosion and solids deposition by vapors produced in the fractional distillation of crude oil. These and other objects and advantages of the present invention will be apparent from the following description.

In accordance with the present invention, NH$_3$ and H$_2$S are removed from an aqueous stream containing significant amounts of nitrogen and sulfur contaminants by steam stripping the aqueous stream in a stripping zone under conditions of temperature and pressure sufficient to produce a first vapor stream containing water and a major portion of the NH$_3$ and H$_2$S and a first liquid stream containing water and minimal amounts of NH$_3$ and H$_2$S, reducing the temperature of the first vapor stream to a temperature at which a substantial portion of hydrogen sulfide is insoluble in water to produce a second vapor stream containing a major portion of the hydrogen sulfide and a second liquid stream containing a major portion of the ammonia and separating the second vapor stream from the second liquid stream in a separation zone. In accordance with another embodiment of the present invention, the second vapor stream is utilized to reduce corrosion and deposition of solids from fluids containing acidic materials.

BRIEF DESCRIPTION OF THE DRAWING

The single FIGURE of the drawing is a schematic flow diagram illustrating one embodiment of the present invention.

DESCRIPTION OF THE PREFERRED EMBODIMENTS

Figure 1:
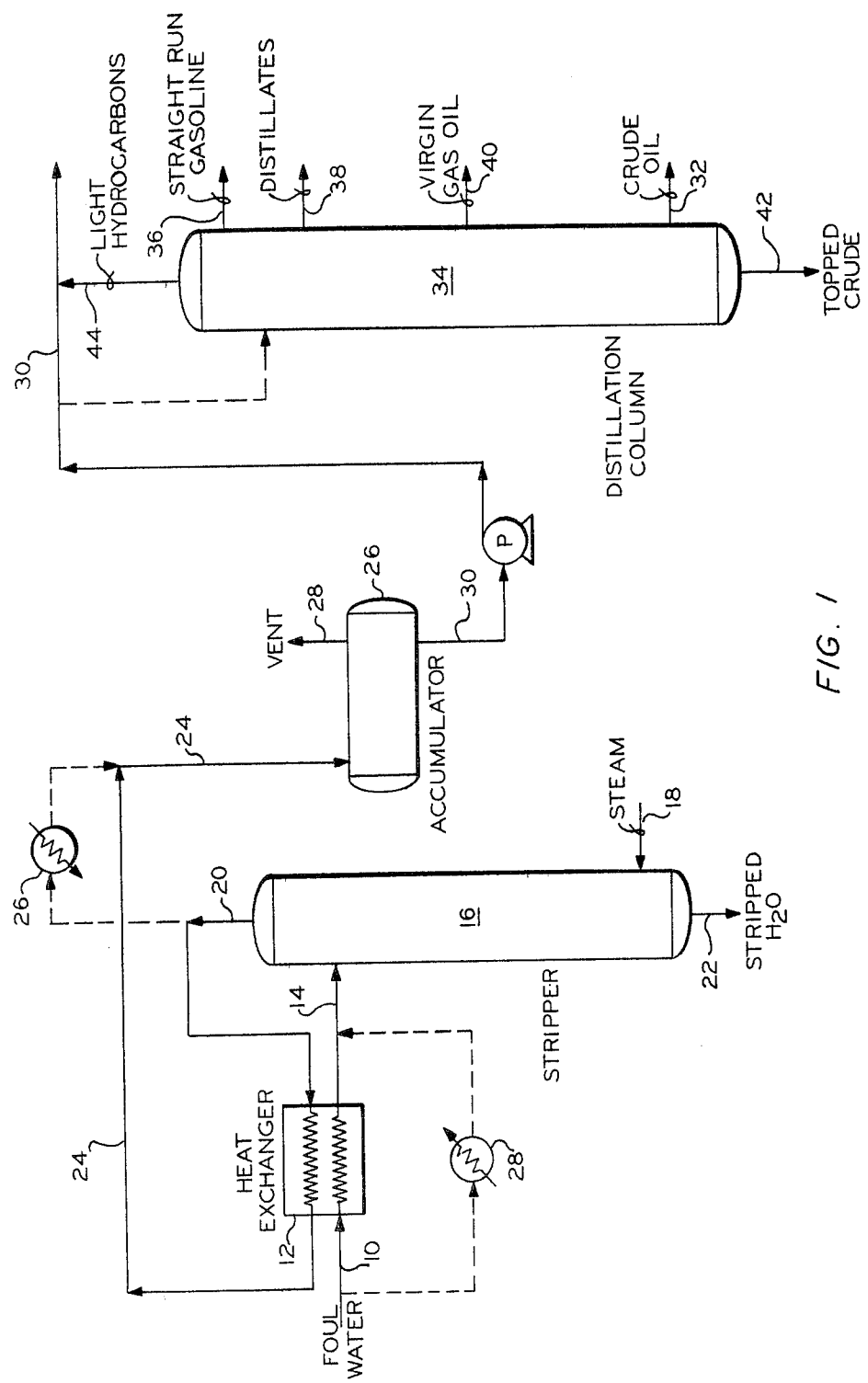

The invention will be best understood by reference to a specific example and the single FIGURE of drawings. While, as previously indicated, the present invention is applicable to the removal of NH$_3$ and H$_2$S from any aqueous stream containing significant amounts of nitrogen and sulfur contaminants and to the utilization of the ammonia thus recovered to reduce corrosion and solids deposition from any fluids containing acidic materials, specific reference will be made to the removal of NH$_3$ and H$_2$S from an aqueous stream derived from petroleum refining operations and the utilization of the thus removed NH$_3$ to treat fluids containing acidic materials, which are also derived from petroleum refining operations. In accordance with the drawing, an aqueous stream containing significant amounts of nitrogen and sulfur contaminants derived from various petroleum refining operations, as previously described in the introductory portion hereof, is introduced through line 10. Such aqueous streams are usually referred to as "foul water" streams or "sour water" streams. The foul water introduced through line 10 can be at any particular temperature as received and usually is at a pressure slightly above atmospheric pressure, such as about 6 to about 10 psig. The foul water from line 10 is passed through heat exchanger 12 where its temperature is increased to a temperature below about 235° F. and preferably between about 225° F. and about 235° F. The heated foul water is then passed through line 14 to stripping column 16. In stripping column 16 the heated foul water is steam stripped by means of steam introduced through line 18, to thereby separate a vapor phase which is discharged through line 20 and a liquid phase which is discharged through line 22. The temperature of operation of steam stripper 16 is selected so as to condense a substantial amount of the water in the foul water stream and the steam introduced through line 18 and, hence, should not be above about 235° F. and preferably is between about 225° F. and about 235° F. at a pressure ranging between about 6 and about 10 psig. Under these conditions the water discharged through line 22 contains minimal amounts of nitrogen and sulfur contaminants and accordingly can be readily disposed of without pollution problems. The vapor stream discharged through line 20 contains some of the water from the foul water and the steam and the major portion of the nitrogen and sulfur contaminants. The vapor stream passing through line 20 may be utilized to heat the foul water by indirect heat exchange in heat exchanger 12, thereby also cooling the vapor stream which is then passed through line 24. As indicated by the dashed flow lines in the FIGURE, all or a part of the cooling of the vapor stream from line 20 can be carried out in a separate cooling unit 26, such as a water cooled indirect heat exchanger 26. Similarly, all or part of the foul water introduced through line 10 can be appropriately heated, as by indirect heat exchange with steam in heating unit 28. In any event, the vapor stream through line 24 is cooled to a temperature at which a substantial portion of H$_2$S is insoluble in water and water present in the vapor stream is condensed. The cooled vapor stream is then passed to accumulator or separator 26. Accumulator 26 is preferably operated at a temperature between about 150° F. and about 180° F. and, to the extent the initial pressure was between about 6 and about 10 psig, the accumulator pressure will be between about 1 and about 5 psig. The cooled first vapor phase is then separated in accumulator 26 into a second vapor phase, which is discharged through line 28, and a second liquid phase, which is discharged through line 30. Utilizing this technique and the preferred conditions, the vapor stream discharged through line 28 will contain a major portion of hydrogen sulfide, some water and a small amount of ammonia. However, this stream can be vented to the atmosphere without pollution difficulties. To the extent that the vapor streams through line 28 contains volumes of NH$_3$ or H$_2$S, which cannot be vented to the atmosphere, further treatment thereof, for example to remove or recover products such as sulfur can be utilized. Such processes are well-known to those skilled in the art. A second liquid stream discharged through line 30 contains a major portion of ammonia, a major portion of the water from the cooled vapor stream and insignificant amounts of hydrogen sulfide. Accordingly, the second liquid stream passing through line 30 can be utilized in the treatment of fluids containing acidic materials to thus reduce corrosion and solids deposition in various treating equipment and flow lines.

In accordance with another specific embodiment of the present invention, a crude oil is fractionally distilled by introducing such crude oil through line 32 to fractional distillation column 34. Distillation column 34 can, for example, be a conventional crude oil atmospheric distillation column. As such, column 34 may be provided with a plurality of trays, a plurality of packed sections or a combination thereof, as well as appropriate trap out trays for removing sidestreams and heating and reboiler means for supplying heat to the column. Most crude oils will usually contain sulfur and chlorine contaminants which form acidic materials. Such acidic materials will normally be concentrated in the vapors of the distillation column and will result in severe corrosion of the distillation column and subsequent flow lines and treating equipment, as well as the formation of solid deposits in a distillation column, flow lines, etc., all as previously pointed out in the introductory portion hereof. In any event, the distillation column can be utilized to produce a straight-run gasoline stream, withdrawn through line 36 one or more distillate streams, withdrawn through line 38, or additional lines, various gas oils, such as a virgin gas oil, withdrawn through line 40, and a liquid phase topped crude, which is discharged through line 42, as well as a vapor phase containing the lowest boiling constituents of the crude oil as well as the previously mentioned acidic gases, which are discharged through line 44. In accordance with the present invention, the second liquid stream containing ammonia is added to the vapor stream from line 44 to thereby reduce corrosion and solid deposition in flow lines treating equipment, etc., as a result of the acid gases contained in the vapor stream passing through line 44. Alternatively, as shown by the dashed flow line of the drawing, all or a part of the second liquid stream from line 30 may be introduced into distillation column 34, preferably in the vapor zone thereof.

The following example shows typical results and conditions of operation in accordance with the present invention. The parenthetic arabic numerals relate to flow lines and/or items of equipment as numbered in the drawing.

| Typical Operation (Calculated) | |
|---|---|
| (I) Flow Rates and Compositions: | |
| (10) Foul Water: | |
| Pounds/hour, | 87,745 |
| Composition, lbs/hr.: | |
| Water | 87,500 |
| Ammonia | 175 |
| Hydrogen Sulfide | 70 |
| Temperature, °F., | 180 |
| (18) Stripping Steam: | |
| Pounds/hour | 16,000 |
| Temperature, °F., | 235 |
| (22) Stripped Water: | |
| Pounds/hour | 95,505 |
| Composition, lbs/hr.: | |
| Water | (a)95,500 |
| Ammonia | 5 |
| Hydrogen Sulfide | nil |
| (20) Stripper Overhead: | |
| Pounds/hour | 8,240 |
| Composition, lbs/hr.: | |
| Water | 8,000 |
| Ammonia | 170 |
| Hydrogen Sulfide | 70 |
| Temperature °F. | 228 |
| (28) Accumulator Vent Gas: | |
| Pounds/hour | 86 |
| Temperature, °F. | 160 |
| (30) Accumulator Liquid Yield: | |
| Pounds/hour | 8,154 |
| Composition, lbs/hr.: | |
| Water | 7,987 |
| Ammonia | 166 |
| Hydrogen Sulfide | 1 |
| II Operating Conditions: | |
| (16) Steam Stripper: | |
| Pressure, psig. | 7 |
| Temperature, °F. | 228 |
| (26) Accumulator: | |
| pressure, psig. | 2 |
| Temperature, °F. | 160 |

(a)Includes steam (18) condensate

While specific materials, items of equipment, combinations of items of equipment, modes of operation, conditions of operation and the like have been set forth herein in the previous description, it is to be understood that such specific references are by way of example and to show the best mode of operation in accordance with the present invention only and therefore are not to be considered limiting.

That which is claimed:

1. A method for removing $NH_3$ and $H_2S$ from an aqueous stream containing significant amounts of nitrogen and sulfur contaminants and reducing corrosion and the deposition of solids from the vapor produced in the fractionation of crude oil comprising:
    (a) steam stripping said aqueous stream in a stripping zone under conditions of temperature and pressure sufficient to produce a first vapor stream, containing water and a major portion of said $NH_3$ and $H_2S$, and a first liquid stream, containing water and minimal amounts of said $NH_3$ and $H_2S$;
    (b) reducing the temperature of said first vapor stream to a temperature at which a substantial portion of $H_2S$ is insoluble in water, to produce a second vapor stream, containing a major portion of said $H_2S$ and a second liquid stream, containing a major portion of said $NH_3$;
    (c) separating said second vapor stream from said second liquid stream, in a separation zone;
    (d) fractionally distilling a crude oil, in a fractionation zone, to produce a plurality of fractions therefrom, including a vapor phase fraction containing a major portion of the lowest boiling components of said crude oil and a liquid phase fraction containing a major portion of the highest boiling components of said crude oil; and
    (e) adding at least a part of said second liquid stream to said vapor phase fraction thus produced by fractionally distilling said crude oil.

2. A method in accordance with claim 1 wherein the second liquid stream is added to the vapor phase fraction produced as an overhead stream in the step of fractionally distilling the crude oil.

3. A method in accordance with claim 1 wherein the second liquid stream is added to the vapor phase zone adjacent the top of the fractionation zone.

4. A method in accordance with claim 1 wherein the vapor phase fraction produced in the step of fractionally distilling the crude oil contains acidic materials.

5. A method in accordance with claim 1 wherein the steam stripping step is carried out at a temperature below about 235° F.

6. A method in accordance with 5 wherein the steam stripping step is carried out at a pressure below about 10 psig.

7. A method in accordance with claim 1 wherein the steam stripping step is carried out at a temperature between about 225° and about 235° F.

8. A method in accordance with claim 7 wherein the steam stripping step is carried out at a pressure between about 6 and about 10 psig.

9. A method in accordance with claim 1 wherein the temperature of the first vapor stream is reduced to a temperature between about 150° F. and about 180° F.

10. A method in accordance with claim 9 wherein the pressure of the first vapor stream is between about 1 andabout 5 psig.

* * * * *